No. 828,334. PATENTED AUG. 14, 1906.
A. PETERSON.
CARBURETER.
APPLICATION FILED APR. 11, 1905.

2 SHEETS—SHEET 1.

Witnesses
Jno Imire
W. N. Woodson

Inventor
Albert Peterson.
By, R. A. R. Lacey, Attorneys

No. 828,334. PATENTED AUG. 14, 1906.
A. PETERSON.
CARBURETER.
APPLICATION FILED APR. 11, 1905.

2 SHEETS—SHEET 2.

Witnesses
Jno Imirie
W. N. Woodson

Inventor
Albert Peterson
By R. S. & A. B. Lacey, Attorneys

UNITED STATES PATENT OFFICE.

ALBERT PETERSON, OF CAMBRIDGE, ILLINOIS.

CARBURETER.

No. 828,334.   Specification of Letters Patent.   Patented Aug. 14, 1906.

Application filed April 11, 1905. Serial No. 254,949.

*To all whom it may concern:*

Be it known that I, ALBERT PETERSON, a citizen of the United States, residing at Cambridge, in the county of Henry and State of Illinois, have invented certain new and useful Improvements in Carbureters, of which the following is a specification.

This invention involves improvements in that class of gas-machines utilized particularly for generating gas to be used for lighting, cooking, or similar purposes.

The invention aims to provide a carbureter of simplified construction the various parts of which are arranged in such a manner as to be readily accessible for purposes of adjustment, repair, or the like, the machine being designed to generate a maximum amount of gas with a minimum quantity of air used in the generation of such gas.

A further object of the invention is to provide a carbureter of the type involving the use of a generator adapted to receive a quantity of liquid carbon, such as gasolene, a supply-tank, and valve means governing the supply of the liquid carbon to the generator in which the regulating means for operating the valve means will feed positively and will not permit leakage, which ordinarily causes the generation of a variable gas with disadvantages of obvious import.

For a full description of the invention and the merits thereof and also to acquire a knowledge of the details of construction of the means for effecting the result reference is to be had to the following description and accompanying drawings, in which—

Figure 1:
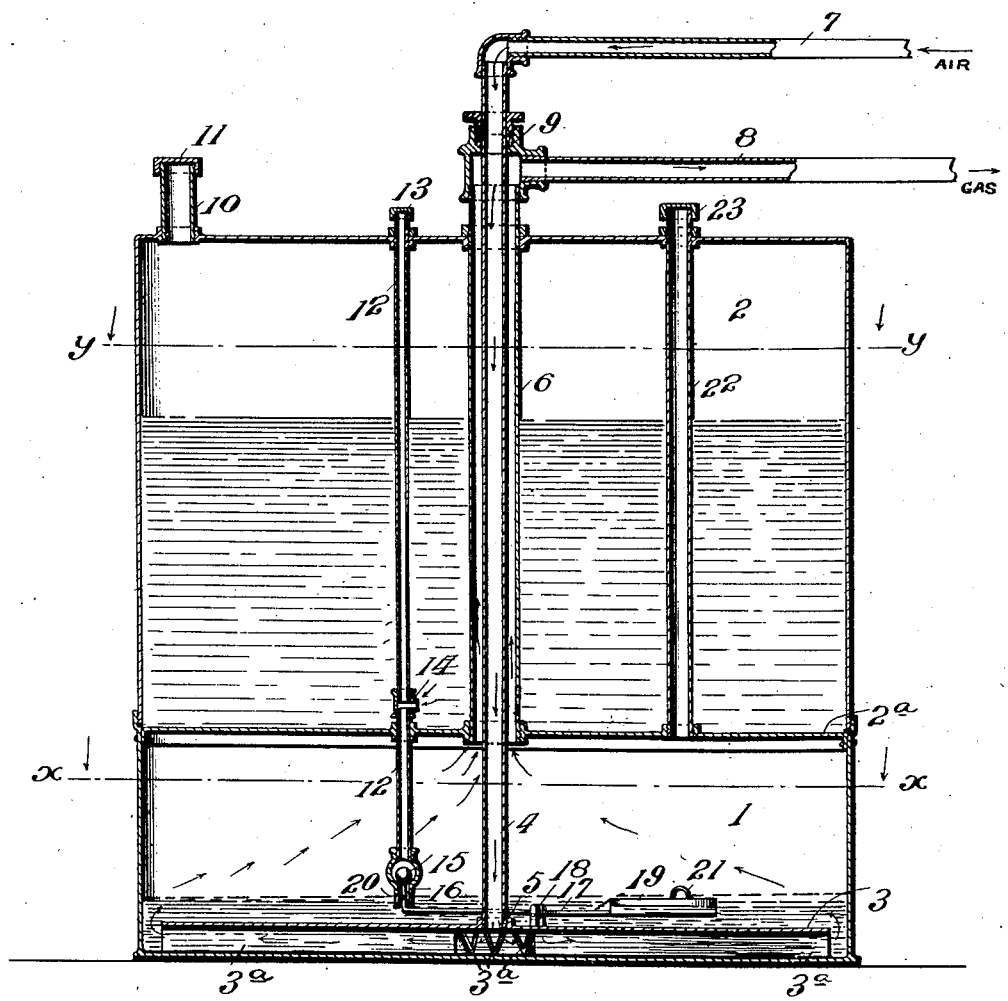
Figure 2:
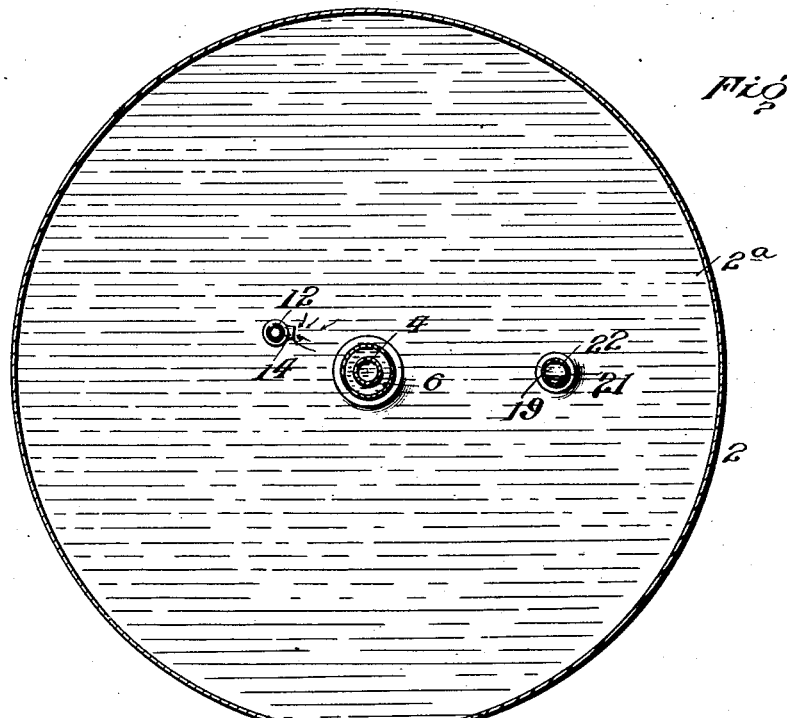
Figure 3:
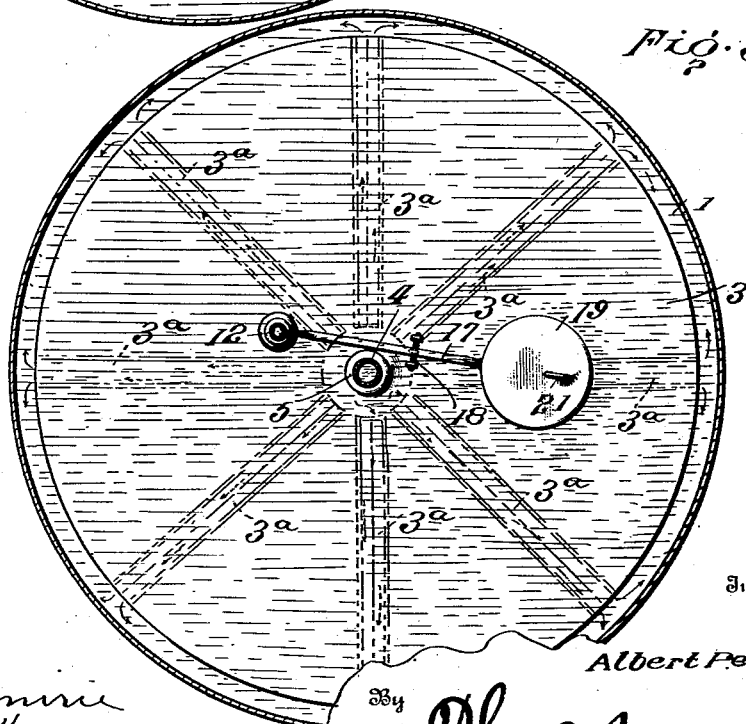

Figure 1 is a vertical sectional view of a gas-machine or carbureter embodying the invention. Fig. 2 is a horizontal sectional view on the line Y Y of Fig. 1 looking downwardly. Fig. 3 is a view similar to Fig. 2, taken on the line X X of Fig. 1.

Corresponding and like parts are referred to in the following description and indicated in all the views of the drawings by the same reference characters.

Specifically describing the invention, the numeral 1 in the drawings represents the generating or carbureting receptacle or tank, above which, and preferably forming a part of the general structure of the tank 1, is located a supply-tank 2, in which the liquid carbon, which is preferably gasolene in this instance, is placed in quantity. The arrangement of the generator 1 and the tank 2 is conducive to compactness in a manner readily apparent. The generator 1 receives a certain quantity of gasolene, which is at the bottom of the receptacle and several inches in depth. Arranged in the generator 1 is a circulating-plate 3 of approximately circular form, said plate 3 being submerged in the body of the gasolene in the generator, so that air passing through an inlet or air pipe 4 into the generator, said pipe passing through the plate 3 about centrally thereof, will be forced through the gasolene at the base of the generator to be thoroughly mixed therewith to effect vaporization and generation of the gas. The air-pipe 4, which passes through the plate 3, is rigidly attached to said plate, having seal connection therewith, as shown at 5, and this pipe extends upwardly from the plate 3 through a pipe 6 of larger diameter connecting with a main air-pipe 7, leading from the air-pumps, which are ordinarily in the basement of the house or conveniently located otherwise. The pipe 6, through which the air-pipe 4 passes, is a gas-pipe which leads through the top of the tank 2, terminating at its lower end at the bottom of said tank in communication with the generating-chamber below. The pipe 6 likewise joins a main gas-pipe 8, leading off to the burners in the dwelling or to any other suitable point of utilization. It will be understood that in the practical use of the invention the apparatus is commonly buried in the earth some distance from the dwelling, which is to be supplied with gas thereby, the pipes 7 and 8 likewise being beneath the surface of the ground below the frost-line. The pipe 8 is joined with the pipe 6 by a T-union 9, preferably, the air-pipe 4 passing through the union in an obvious manner. A filling-pipe 10 is provided for the tank 2, said pipe extending, preferably, from its upper extremity and provided with a suitable cap 11. The generator 1 is supplied with the hydrocarbon in the tank 2 by means of the supply-pipe 12, which extends vertically through the bottom of the tank 2 to the top thereof, having a cap 13 at its upper extremity. An inlet-opening 14 affords communication between the portion of the pipe 12 below the bottom $2^a$ of the tank 2 and the interior of said tank, the gasolene being adapted to pass through the opening 14 into the pipe 12 and out the lower end of this pipe 12, said lower end terminating at a point just above the plate 3 in the generator 1.

The lower end of the pipe 12 is normally closed by means of a valve 15, a nozzle 16 projecting downwardly from the casing of said valve and having its lower end portion normally submerged in the gasolene or hydrocarbon in the generator 1 for reasons which will appear more fully hereinafter. The valve 15 is operated by a lever 17, fulcrumed upon the upper side of the plate 3, as shown at 18, this lever having a float 19 at one end operated by the variation in the quantity of the gasolene in the generator, the opposite end of the lever 17 having an extension 20, projecting upwardly from the nozzle 16 and adapted to engage the valve 15, so as to raise the latter in opening the same. The float 19 is of the usual hollow form, being of approximately circular construction, and upon the upper side of said float is an engaging member in the form of a loop 21. The loop 21 is arranged below the lower extremity of a tube 22, which passes through the bottom 2ª to the top of the tank 2, said tube having a cap 23 at its upper extremity. The tube 22 is of a size admitting of passage of a rod or like device therethrough, so as to engage said rod with the loop or engaging member 21 of the float 19 to actuate this float in the event the latter does not operate freely in its coöperation with the valve 15. The tube 22 is not only utilized as a means for having access to the member 21 for the purpose above mentioned, but said tube will admit of initially filling the generator with the hydrocarbon preparatory to first using the machine, if it be desired to pour the hydrocarbon through the tube in the generating-chamber.

Describing the operation and advantages of the apparatus hereinbefore set forth, it will be noted that the arrangement of the plate 3 in the generator 1 is such that the quantity of gasolene or hydrocarbon therein may be comparatively small, so that air may be forced through the body of the liquid carbon without a great amount of pressure, as is necessary in the majority of machines of this class. The air passes from the pipe 4 through the body of the gasolene beneath the plate 3 and thence outwardly from the center of the plate and upwardly into the body of the generator 1, the outer peripheral portions of the plate 3 being of course spaced from the sides of the generator to permit the air to take the course above indicated. The gas is generated in the chamber of the generator 1 in the manner above described and passes from the generator through the pipes 6 and 8 to the dwelling or points of utilization. When the level of the gasolene in the generator 1 lowers, the float 19 of course moves downwardly, raising the extension 20 and opening the valve 15, according to the degree of movement of the float. Opening of the valve 15 permits the gasolene in the supply-tank 2 to pass into the generator, said gasolene entering the pipe 12 through the opening 14. When the normal level of the gasolene in the generator 1 has been restored, the float 19, moving upwardly, disengages the extension 20 from the valve, permitting the latter to close by gravity, cutting off the inflowing gasolene in the pipe 12. The provision of the nozzle 16 at the lower extremity of the pipe 12 is important in securing proper feeding of the gasolene and action of the valve 15, since the submerged nozzle prevents the pressure in the generator 1 from entering the pipe 12 and forcing the valve upwardly, causing the same to leak or otherwise affect its operation. Further, the passage of the gasolene through the pipe 12 into the generator 1 tends to create a vacuum in the tank 2, so that when the valve 15 is closed, there being virtually no air-pressure in the tank 2 and no means for ingress of air, likelihood of leakage of the gasolene through the valve 15 into the generator is entirely obviated. However, when the surface or level of the gasolene in the generator lowers to a point where the nozzle 16 is no longer submerged the extension 20 will of course have been raised to actuate the valve, as before described, and the air in the generator 1 is permitted to pass up through the pipe 12 into the tank 2, so that the gasolene in said tank may be freely supplied to the generator when the valve is open. The plate 3 is preferably made of metal, and said plate rests upon a plurality of hollow supports, preferably consisting of V-shaped ribs 3ª, which space the same from the bottom of the generator 1 and which are arranged radially of the plate, as shown most clearly in the drawings. It will be obvious that it is designed that the normal level of the hydrocarbon in the generator 1 be some distance above the plate 3, for if said level becomes lower than said plate it is clear that the air passing through the pipe 4 into the generating-chamber will be forced through the pipe 6 and out of the generator without accomplishing the generation of the gas. The provision of the pipe 12 in the construction shown is advantageous, in that the cap 13 may be moved and direct access may be had directly to the valve 15 and the interior of the pipe in the event the latter becomes clogged or it is desired to reach the valve and its casing.

Having thus described the invention, what is claimed as new is—

In a carbureter, the combination of superposed reservoir or generating tanks, a plate located within the generating-tank and spaced a short distance from the bottom thereof, hollow supports for said plate resting upon the bottom of the generating-tank and having a radial arrangement, a pipe passing centrally through the reservoir and generating-tank and connecting with the center of said plate, a second pipe concentric with the first-mentioned pipe and communicating with the upper portion of the generating-tank and passing through the reservoir-tank, a feed-pipe extended through the reservoir-tank and passing into the generating-tank and having a nozzle at its lower end and a valve-casing above said nozzle and provided with a feed-opening above the bottom of the reservoir-tank, a valve located in the casing of the feed-pipe, a float-controlled lever having an upwardly-extended portion entering the nozzle of the feed-pipe coming in contact with the valve controlling the same, said lever having an engaging portion at its float end, and a pipe 22 extending through the reservoir-tank and about in line with the engaging element of the float-controlled lever, the upper ends of the pipe 22 and the said feed-pipe being adapted to be closed.

In testimony whereof I affix my signature in presence of two witnesses.

ALBERT PETERSON. [L. S.]

Witnesses:
CARL J. JOHNSON,
J. G. A. GUSTAFSON.